Jan. 3, 1956  B. WASKO  2,729,438
MOUNTINGS FOR WEIGHT SUPPORTING MEMBERS OF ANALYTICAL BALANCE
Filed March 1, 1954
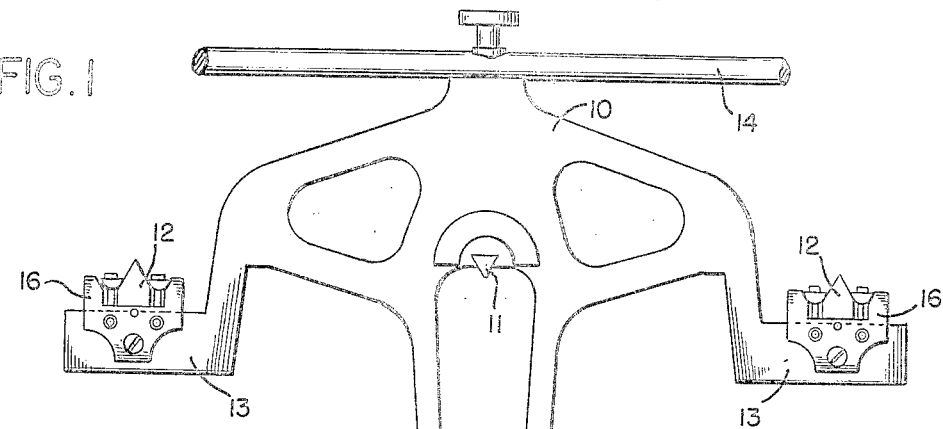
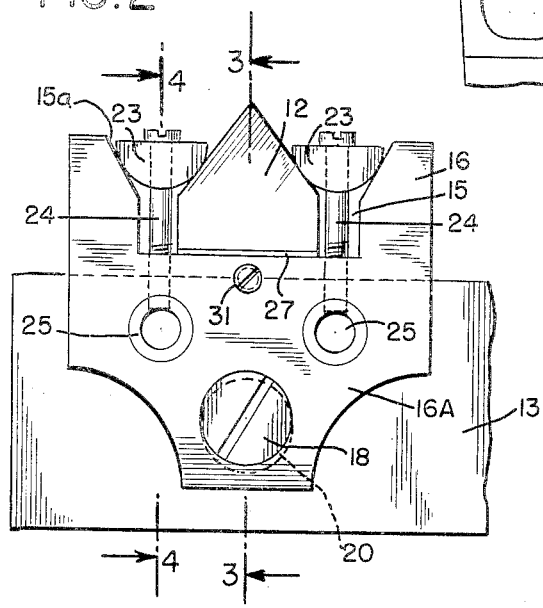
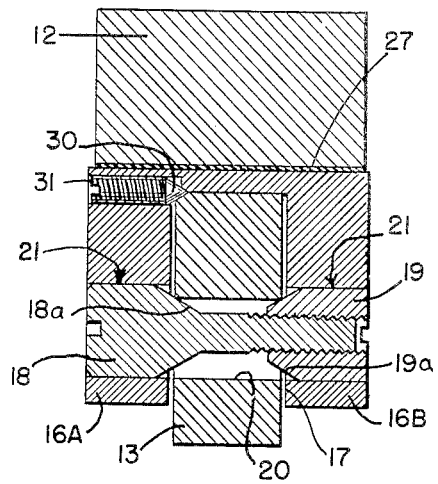
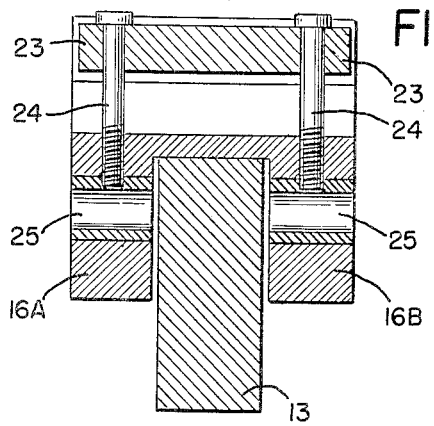
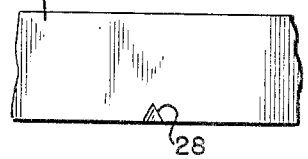
*INVENTOR.*
BERNARD WASKO
BY
Campbell, Brumbaugh, Free &
Graves
ATTORNEYS

United States Patent Office 2,729,438
Patented Jan. 3, 1956

2,729,438

MOUNTINGS FOR WEIGHT SUPPORTING MEMBERS OF ANALYTICAL BALANCE

Bernard Wasko, New Rochelle, N. Y., assignor to Voland and Sons, Inc., New Rochelle, N. Y., a corporation of New York Application March 1, 1954, Serial No. 413,347

6 Claims. (Cl. 265—49)

This invention relates to precision analytical weighing balances, and it relates particularly to an analytical balance wherein provision is made for precision adjustment of the weight supporting knives on each side of the center knife-edge pivot upon which the known weights and the object or material to be weighed are applied to the balance beam.

In a precision analytical weighing balance, a most important consideration is the accuracy of these knife edges, with special regard to their shape, material, symmetrical disposition and relative location. In the present invention the carefully selected agate knives are precision sharpened to correct angles, and the weight-supporting knives are set in blocks or housings which are carried by outstretched arms of the balance beam. It is important that the knife edges of the weight supporting knives be substantially parallel to each other and to the knife edge of the center pivot of the balance beam, hence the accurate adjustment of the weight supporting knives in their respective housings is an extremely important factor in a precision weighing instrument.

The knives are set into recesses formed in the tops of the housing and between oppositely inclined side walls of the recesses, the knife edges running in a fore-and-aft direction, and after being carefully adjusted both laterally and in a fore-and-aft direction the weight supporting knives are locked in the desired position between a pair of vertically adjustable semi-cylindrical wedges. Each of the wedges is held in place by a pair of screws mounted at their lower ends to the housing in a way that will allow them a slight amount of pivotal movement to prevent their bending or binding as the knife is adjusted transversely.

In this arrangement the semi-cylindrical wedges may be adjusted up and down independently of each other, or angularly in a forwardly or rearwardly inclined position to insure precise positioning and alignment of the weight supporting knives on the balance beam, and because the cylindrical surfaces of the wedges engage the oppositely inclined surfaces of the knives, each knife is always firmly and positively locked in proper position by a line contact with the wedges on either side. In addition, provision is made for adjusting the knives angularly in a vertical plane, so that the knife edges can be accurately leveled.

For a better understanding of the present invention, reference may be had to the accompanying drawing in which:

Fig. 1 is a partial front elevation of a typical balance embodying the present invention;

Fig. 2 is an enlarged front view of one of the end knives locked within its supporting housing on the balance arm;

Fig. 3 is a cross-section view taken along the line 3—3 of Fig. 2, looking in the direction of the arrows;

Fig. 4 is a cross-section view taken along the line 4—4 of Fig. 2, looking in the direction of the arrows; and Fig. 5 is a top plan view of the upper surface of one of the balance arms showing the beveled notch thereof which is adapted to be engaged by the leveling screw of the housing for vertically tilting the knife edge.

Referring to the drawing, and especially to Figure 1, the balance beam chosen for purposes of illustration includes a rigid beam 10 which carries a center knife-edge pivot 11 and weight supporting knives 12 mounted at opposite ends of the outwardly extending supporting arms 13. The beam 10 is balanced about the center knife-edge pivot 11 upon a fulcrum support (not shown). The knives 12 are for supporting the weights which are to be balanced. The horizontally disposed rod 14 mounted to the top of the beam 10 carries dampening members (not shown) at both extreme ends which form no part of the present invention.

The weight supporting knives 12, the outwardly extending arms 13 and the means whereby the end knives are mounted on the outwardly extending arms are identical on both sides of the center pivot 11, and for purposes of the present invention, it will be necessary to describe but one side of the balance in detail.

As shown in Figure 2, each of the end knives 12 is set into a fore-and-aft channel 15 formed in the upper surface of a housing 16. The underside of the housing 16 is formed with a transverse slot 17 (see Fig. 3), dividing it into front and rear beam straddling members 16A and 16B, respectively, which abut the front and rear surfaces of the arm 13. The front and back straddling members 16A, 16B are reamed out to form the aligned horizontal holes 21 and the arm 13 is also provided with a horizontal hole 20. These holes 20, 21 accommodate a mounting screw 18 and a companion clamping nut 19 which serve not only to attach the housing 16 to the arm 13, but also to hold down the housing against the upper surface of the balance arm to insure the proper seating thereof. Although approximately aligned with the holes 21 formed in the front and rear straddling members of the housing, the hole 20, as shown in Figs. 2 and 3, is located slightly below them so that as the screw and nut are tightened, the tapered shank 18a of the screw bears against the upper front edge of the hole 20 and the tapered shank 19a of the nut bears against the upper back edge of the hole 20, thereby pulling the housing 16 down tightly upon the upper surface of the arm 13.

As best shown in Figures 2 and 4, the knife 12 is held in place within the channel 15 of the housing by means of fore-and-aft adjustable wedges 23. The wedges 23 are semi-cylindrical and the cylindrical surfaces lie between and engage the sloping surfaces of the knife 12 and the sloping surfaces 15a of the side walls of the channel 15. Each wedge is held in place by forward and rearward adjusting screws 24, which adjusting screws pass through the upper flat surface of the wedge and through accommodating vertical holes formed for them in the housing 16, and they are adapted to be anchored at their lower ends in swivel sleeves or nuts 25 accommodated in fore-and-aft boring in the housing. The purpose of the swivel sleeves or nuts is to permit the adjusting screws to tilt slightly as the knife is transversely adjusted without causing them to bend or bind. It is clear that by tightening the screws to lower the wedge on one side of the knife and loosening them to permit the wedge on the other side to be forced upwardly, the knife can be shifted laterally on the base of the channel 15 to adjust the relative position of the knife 12 on the arm 13, thus regulating the effective arm length of the balance. The knife may also be adjusted angularly upon the flat base of the channel by tightening the forward screw of the one wedge and the rear screw of the other wedge and by loosening the other two screws, or in other words, by tightening the diagonally opposite screws and by loosening the other diagonally opposite screws. It is apparent that these adjustments can be made micromatically without causing any damage to the knives, the latter being engaged only by the cylindrical surfaces of the aluminum wedges so that they have no direct contact with the screws 24. The height of the knives 12 is determined by precision shims 27 which are located directly below the base of the knife.

To insure that the edge forming the apex of each of the knives 12 may be aligned parallel with respect to each other, and to the knife-edge of the center pivot 11, provision is made for vertically tilting the knife 12 with respect to the flat supporting surface of the channel 15 upon which the weight supporting knife 12 rests. This is accomplished by pivoting or tilting the housing 16 upon and with respect to its supporting arm 13 of the balance beam. For this purpose, the upper front edge of the arm 13 contains a groove or notch 28 which, as shown in Fig. 3, forms a bevel 30 in the upper front edge of the arm. Also, the front of the housing is provided with a small threaded hole to accommodate a small leveling screw 31. The leveling screw 31 has a tapered point which engages the bevel 30 in the notch 28, creating a wedge action between the housing 16 and the arm 13. Because of the clearance between the upper surface of the beam and the housing 16, screwing in of the leveling screw 31 slightly raises the front of the housing 16 in relation to the beam 13, thereby elevating the front of the knife 12, whereas, backing off on the leveling screw somewhat lowers the front of the knife. For the very slight adjustment normally required of the leveling screw 31, the usual play between the beam and the housing should be adequate, however, it is apparent that the clearance can be readily increased, if necessary, merely by loosening the clamping screw 18 and nut 19.

From the foregoing description, it is clear that each of the knives 12 can be adjusted laterally by adjusting the level of the semi-cylindrical wedges 23 on either side of the knife, angularly upon the horizontal surface of the supporting housing 16 by forwardly tilting one of the wedges and rearwardly tilting the other and finally tilted vertically by adjusting the leveling screw 31.

In the specification the weight-supporting fulcra 12 have been referred to as "knives." It should be understood, therefore, that the term "knife" is used in its broadest sense and is intended to include a fulcrum wherein a straight edge apex is formed including an edge formed by a V-shaped depression.

The invention has been shown and described in a single preferred form and by way of example, and obviously many variations and modifications may be made therein without departing from the spirit of the invention. It is to be understood, therefore, that the invention is not to be limited to any specific form or embodiment except in so far as such limitations are specified in the appended claims.

I claim:

1. In a weighing balance having a pivoted beam, the combination of a weight supporting member supported on the beam, the sides of said weight supporting member having inclined surfaces, an adjustable wedge member engaging one of said inclined surfaces, an adjustable wedge member engaging the other of said inclined surfaces, each adjustable wedge member having a curved surface in contact with the respective inclined surface of the weight supporting member which it engages, and means for adjusting the height and the angular position of each adjustable wedge member, the relative heights and angular positions of the two adjustable wedge members determining the position of the weight supporting member on the beam.

2. In a weighing balance having a pivoted beam, a weight supporting member, a platform for supporting the weight supporting member on the beam, the sides of said weight supporting member having inclined surfaces, an adjustable wedge member engaging one of the inclined surfaces, an adjustable wedge member engaging the other inclined surface, each adjustable wedge member having a cylindrical surface in contact with the respective inclined surface of the weight supporting member which it engages, at least two substantially vertically adjustable screws for locking each of the adjustable wedge members in place on the platform, the screws permitting the height and angular position of the wedge member to be adjusted, the cylindrical surface of the adjustable wedge member, nevertheless, making a line contact at all times with the inclined surface of the weight supporting member which it engages, the relative heights and angular positions of the two adjustable wedge members determining the lateral position and angle of the weight supporting member on the supporting platform.

3. A weighing balance as set forth in claim 2 including an inclined surface engaged by at least one of said adjustable wedge members, said surface being oppositely inclined with respect to the inclined surface of the weight supporting member engaged by said adjustable wedge member, the adjustable wedge member lying between the two oppositely inclined surfaces.

4. A weighing balance as set forth in claim 2 including rotatable nuts set into the platform for threadably engaging the lower ends of the screws, said rotatable nuts permitting pivotal movement of the screws in the platform.

5. A weighing balance as set forth in claim 2 wherein the platform for the weight supporting member is mounted on the beam, and including an adjustable wedge for adjusting the angular position of the platform.

6. A weighing balance as set forth in claim 5 wherein the platform is provided with a seat which straddles the beam and wherein the wedge for adjusting the angular position of the platform has a tapering point and the beam is formed with a beveled edge engaged by said tapering point, whereby the level of the platform may be adjusted with respect to the beam.

References Cited in the file of this patent
UNITED STATES PATENTS

| | | |
|---|---|---|
| 1,207,410 | Kaiser | Dec. 5, 1916 |
| 1,686,377 | Hanson | Oct. 2, 1928 |
| 1,954,181 | Oates | Apr. 10, 1934 |
| 1,969,363 | Gilbert | Aug. 7, 1934 |
| 2,256,318 | Hadley | Sept. 16, 1941 |